J. BRYANT.
CAR-SEATS.

No. 180,751.

Patented Aug. 8, 1876.

Witnesses.
Rob't G. Dieterich
Albert E. Redstone.

Inventor.
James Bryant.
per Daniel Breed
Att'y

UNITED STATES PATENT OFFICE.

JAMES BRYANT, OF COVINGTON, INDIANA.

IMPROVEMENT IN CAR-SEATS.

Specification forming part of Letters Patent No. 180,751, dated August 8, 1876; application filed May 27, 1876.

*To all whom it may concern:*

Be it known that I, JAMES BRYANT, of Covington, in the county of Fountain and State of Indiana, have invented certain new and useful Improvements in Car and Carriage Seats; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The chief object of my invention is to make a car-seat or carriage-seat which, from its great elasticity, will protect the passenger from concussion or shaking in passing over rough roads, and from being thrown from the seat in case of accident or collision; and my invention consists of a car or carriage seat provided with a slide-plate, resting upon springs, and with a king-bolt and various other devices, all of which will be fully understood by the following description.

Figure 1:
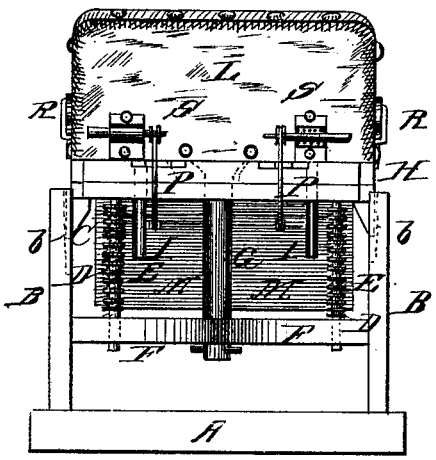
Figure 2:
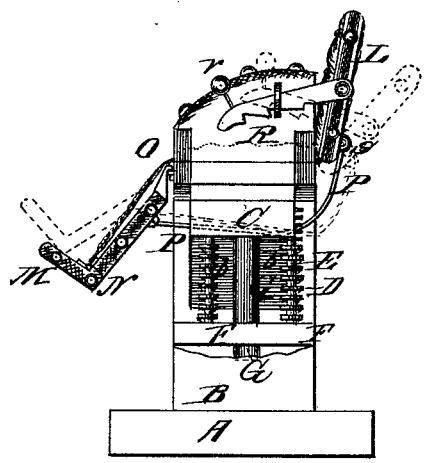
Figure 3:
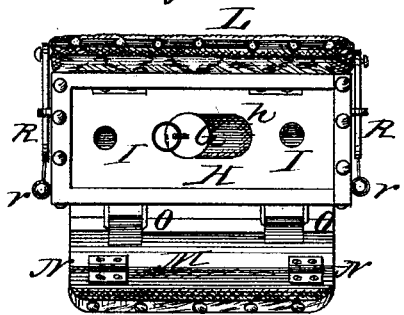

In the accompanying drawings, Figure 1 is a rear view of my improved car-seat. Fig. 2 is a side view with the slotted end piece cut away to show the springs and other parts. Fig. 3 is a top view with the cushion removed.

In the accompanying drawings, the floor of the car or carriage is represented at A, to which are firmly fastened two upright pieces, B, having broad slots b to receive and hold the slide-plate C. This plate is supported on four or more springs, D, provided with guide-bolts E, which are rigidly fixed in the slide-plate, and work up and down in holes in the shelf F, or one or more elliptical springs may be used. In place of this shelf F, the springs may rest on the floor of the car or carriage body, if desired. A king-bolt, G, holds the slide-plate C, and extends up through the seat-bed H, and thus serves as a pivot upon which the seat-bed rotates in reversing the seat. The seat-bed has a slot, h, for the purpose of allowing the seat-bed to move endwise upon the king-bolt, and thus prevent striking the side of the car in turning or reversing the seat. This seat-bed is provided with two pins, I, which must be removed before the seat will turn.

The back L of the seat is hinged to the seat-bed H, and the lap and foot board M has hinges N, and also hook-hinges O, which allow the lap and foot board to be removed for the purpose of turning the seat, as above explained.

The back of the seat is connected to the lap and foot board by means of the curved brace-rods P, the forward ends of which are held by pivots, but the rear ends are fastened by spring-bolts S, which always keep their place, and yet may be easily drawn back to release or insert the ends of the brace-rods P. By this arrangement the lowering of the back of the seat raises the foot and lap board, as shown in dotted lines, Fig. 2. The back of the seat, when adjusted, is held in place by means of the ratchet-bar R, Fig. 2, provided with a knob, r, to conveniently fit the hand.

If it be desired, the seat and seat-bed may be turned lengthwise of the car, so that the passenger may ride sidewise, for the sake of a change of position and motion.

Having thus described my invention, I claim—

1. The sliding plate C, provided with the guide-bolts E, and supported on springs D, in combination with the slotted end pieces B, substantially as set forth.

2. The king-bolt G, in combination with the slide-plate and the slotted seat-bed H and pins I, substantially in the manner and for the purposes specified.

In testimony that I claim the foregoing as my own I affix my signature in presence of two witnesses.

JAMES BRYANT.

Witnesses:
DANIEL BREED,
FRED. G. DIETERICH.